(12) United States Patent
Horikawa et al.

(10) Patent No.: US 11,717,926 B2
(45) Date of Patent: Aug. 8, 2023

(54) CONTROL DEVICE FOR MACHINE TOOL

(71) Applicant: FANUC CORPORATION, Yamanashi (JP)

(72) Inventors: Yuutarou Horikawa, Yamanashi (JP); Masashi Yasuda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/841,336

(22) Filed: Jun. 15, 2022

(65) Prior Publication Data

US 2022/0305602 A1 Sep. 29, 2022

Related U.S. Application Data

(62) Division of application No. 17/021,820, filed on Sep. 15, 2020, now Pat. No. 11,396,073.

(30) Foreign Application Priority Data

Oct. 3, 2019 (JP) .................................. 2019-183314

(51) Int. Cl.
*B23Q 15/013* (2006.01)
*B23Q 15/08* (2006.01)
(Continued)

(52) U.S. Cl.
CPC ............. *B23Q 15/013* (2013.01); *B23G 1/04* (2013.01); *B23G 11/00* (2013.01); *B23Q 15/08* (2013.01); *B23Q 17/20* (2013.01)

(58) Field of Classification Search
None
See application file for complete search history.

(56) References Cited

U.S. PATENT DOCUMENTS

2011/0066277 A1\* 3/2011 Mann ..................... B23Q 15/12
700/174
2018/0281090 A1 10/2018 Watanabe et al.
2019/0310600 A1\* 10/2019 Yamamoto ........... G05B 19/182

FOREIGN PATENT DOCUMENTS

JP         H01-321138 A      12/1989
JP         2001150201 A *   6/2001
(Continued)

OTHER PUBLICATIONS

Translation of JP-2020124793-A (Year: 2020).\*

*Primary Examiner* — Ryan A Jarrett
(74) *Attorney, Agent, or Firm* — Studebaker & Brackett PC (57) ABSTRACT

To provide a control device for a machine tool capable of performing thread cutting while reducing the load on the machine tool from the oscillating operation, without extending the cycle time, and capable of reliably shredding chips in a case of performing the non-oscillating operation in the present pass after the oscillating operation in the previous pass. A control device for a machine tool includes: an oscillating operation execution determination unit that determines whether to execute an oscillating operation that causes the cutting tool to oscillate in the radial direction of the workpiece; an oscillation command generation unit that generates an oscillation command of the oscillating operation based on a determination result; a control unit that superimposes the oscillation command on a position command of the feed axis to generate a drive command. The oscillating operation execution determination unit determines to intermittently execute the oscillating operation, and the oscillation command generation unit generates an oscillation command so that a non-oscillating cutting portion of a present pass includes a portion at which oscillating cutting was performed in a previous pass, or so that an oscillating (Continued)

cutting portion of the present pass includes a portion at which non-oscillating cutting was performed in the previous pass.

7 Claims, 8 Drawing Sheets

(51) Int. Cl.
    *B23G 11/00*     (2006.01)
    *B23Q 17/20*     (2006.01)
    *B23G 1/04*     (2006.01)

(56) References Cited

FOREIGN PATENT DOCUMENTS

| | | | |
|---|---|---|---|
| JP | 2020124793 A | * | 8/2020 |
| WO | 2016/056526 A1 | | 4/2016 |

\* cited by examiner

CONTROL DEVICE FOR MACHINE TOOL

This application is a Divisional of U.S. patent application Ser. No. 17/021,820 filed on Sep. 15, 2020, which is based on and claims the benefit of priority from Japanese Patent Application No. 2019-183314, filed on Oct. 3, 2019, the content of which is incorporated herein by reference.

BACKGROUND OF THE INVENTION

Field of the Invention

The present invention relates to a control device for a machine tool.

Related Art

Conventionally, a technique for realizing thread cutting while shredding chips has been known. For example, a technique has been known of causing reciprocating vibration of a workpiece and a cutting tool during a predetermined plurality of times a cutting-in process, and setting the vibration pattern for each time of the cutting-in process involving the reciprocating vibration in such a manner that a portion already machined by a different cutting-in process is partially included in a portion to be machined in a predetermined cutting-in process (e.g., see International Publication No. WO2016/056526).
Patent Document 1: PCT International Publication No. WO2016/056526

SUMMARY OF THE INVENTION

However, in the technique of PCT International Publication No. WO2016/056526, since the reciprocating vibration of the workpiece and the cutting tool (hereinafter, also referred to as oscillating operation) is always performed during thread cutting, the load on the machine tool due to the reciprocating vibration is large. Therefore, a control device for a machine tool has been desired which is capable of performing thread cutting while reducing the load on the machine tool due to the oscillating operation without extending the cycle time which is important in the machining by the machine tool.

Furthermore, in the technique of International Publication No. WO2016/056526, the positional deviation which is deviation between a position command and the actual position is large for reasons such as a response delay during the oscillating operation, whereby incomplete cutting occurs (see FIG. 7 to be described later). Therefore, it is presently difficult to realize the shredding of chips in the finishing processing in the final pass, and thus, a control device for a machine tool has been desired that is able to reliably shred chips in a case of performing the non-oscillating operation in the present pass after the oscillating operation in the previous pass, as in the finishing processing in the final pass of the thread cutting.

An aspect of the present disclosure relates to a control device for a machine tool that performs a coordinated operation of at least one spindle for relatively rotating a cutting tool and a workpiece, and at least one feed axis for moving the cutting tool relative to the workpiece, and performs thread cutting while causing the cutting tool to perform a plurality of times a cutting-in process on the workpiece in a radial direction, the control device including: an oscillating operation execution determination unit that determines whether to execute an oscillating operation that causes the cutting tool to oscillate in the radial direction of the workpiece; an oscillation command generation unit that generates an oscillation command of the oscillating operation based on a determination result by the oscillating operation execution determination unit; and a control unit that superimposes the oscillation command on a position command of the feed axis to generate a drive command of the feed axis, in which the oscillating operation execution determination unit determines to intermittently execute the oscillating operation, and in which the oscillation command generation unit generates an oscillation command so that a non-oscillating cutting portion of a present cutting-in operation includes a portion at which oscillating cutting was performed in a previous cutting-in operation, or so that an oscillating cutting portion of the present cutting-in operation includes a portion at which non-oscillating cutting was performed in the previous cutting-in operation.

According to the present disclosure, it is possible to provide a control device for a machine tool capable of performing thread cutting while reducing the load on the machine tool due to the oscillating operation, without extending the cycle time. Furthermore, it is possible to provide a control device for a machine tool that is able to reliably shred chips in a case of performing the non-oscillating operation in the present pass after the oscillating operation in the previous pass, as in the finishing processing in the final pass of the thread cutting.

DETAILED DESCRIPTION OF THE INVENTION

Hereinafter, one aspect of the present disclosure will be described in detail with reference to the drawings.

A control device for a machine tool according to an aspect of the present disclosure performs a coordinated operation of at least one spindle for relatively rotating a cutting tool and a workpiece, and at least one feed axis for moving the cutting tool relative to the workpiece, and performs thread cutting while causing the cutting tool to perform a plurality of times the cutting-in process on the workpiece in the radial direction.

Figure 1:
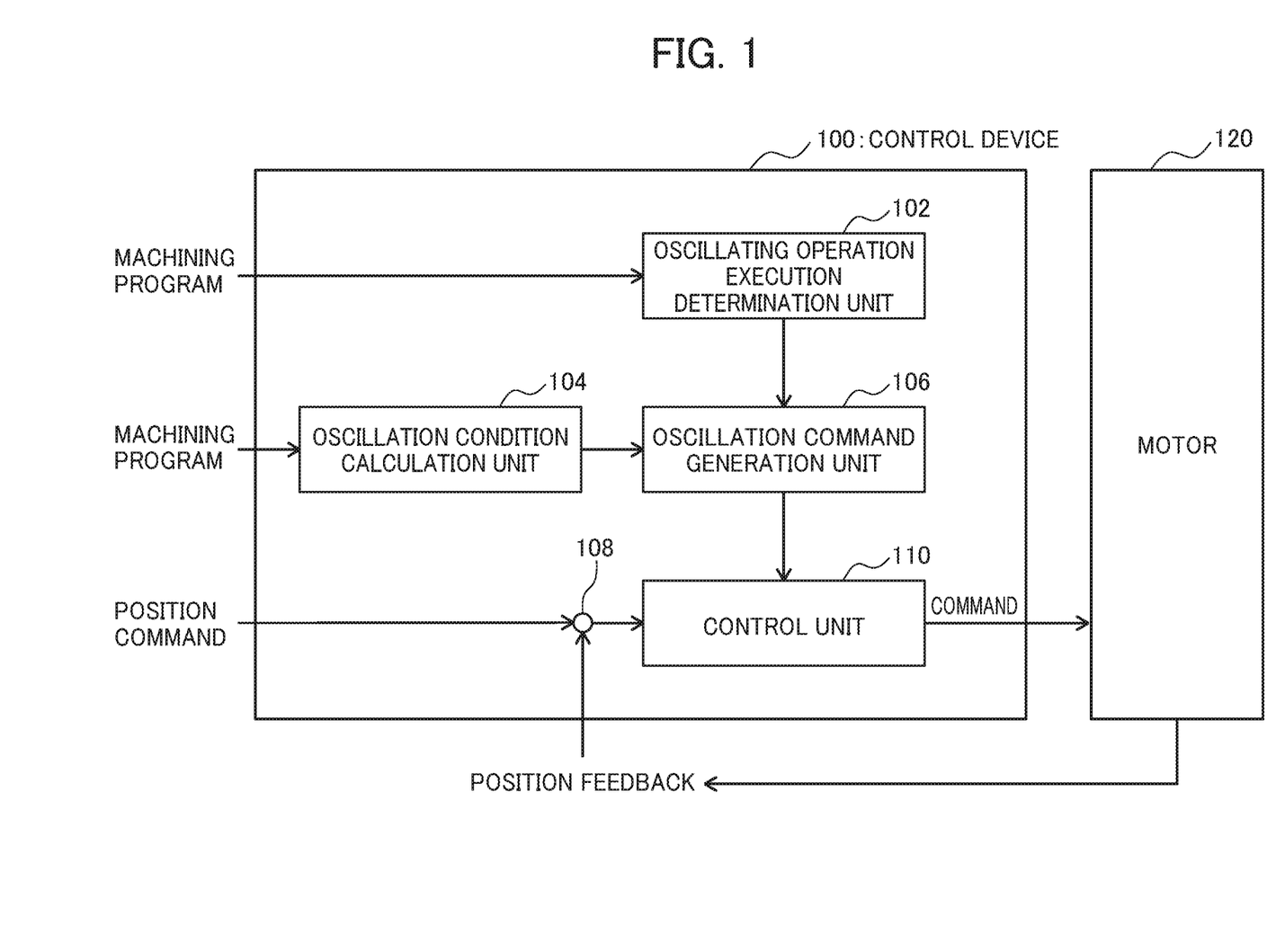
FIG. 1 is a functional block diagram showing the configuration of a control device for a machine tool according to an aspect of the present disclosure.

FIG. 1 is a functional block diagram showing a configuration of a control device 100 for a machine tool according to an aspect of the present disclosure. As shown in FIG. 1, the control device 100 outputs a drive command for performing a coordinated operation of these axes on a motor 120 that drives at least one spindle for relatively rotating a cutting tool and a workpiece, and at least one feed axis for moving the cutting tool relative to the workpiece.

Figure 2:
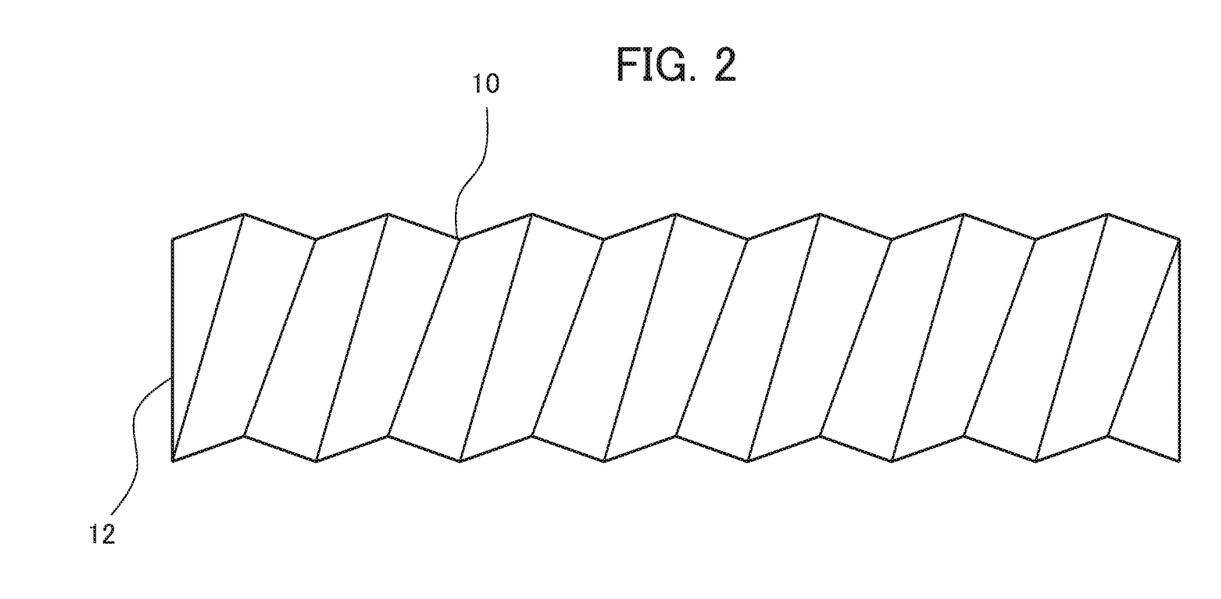
FIG. 2 is a diagram showing a screw created by thread cutting.
Figure 3:
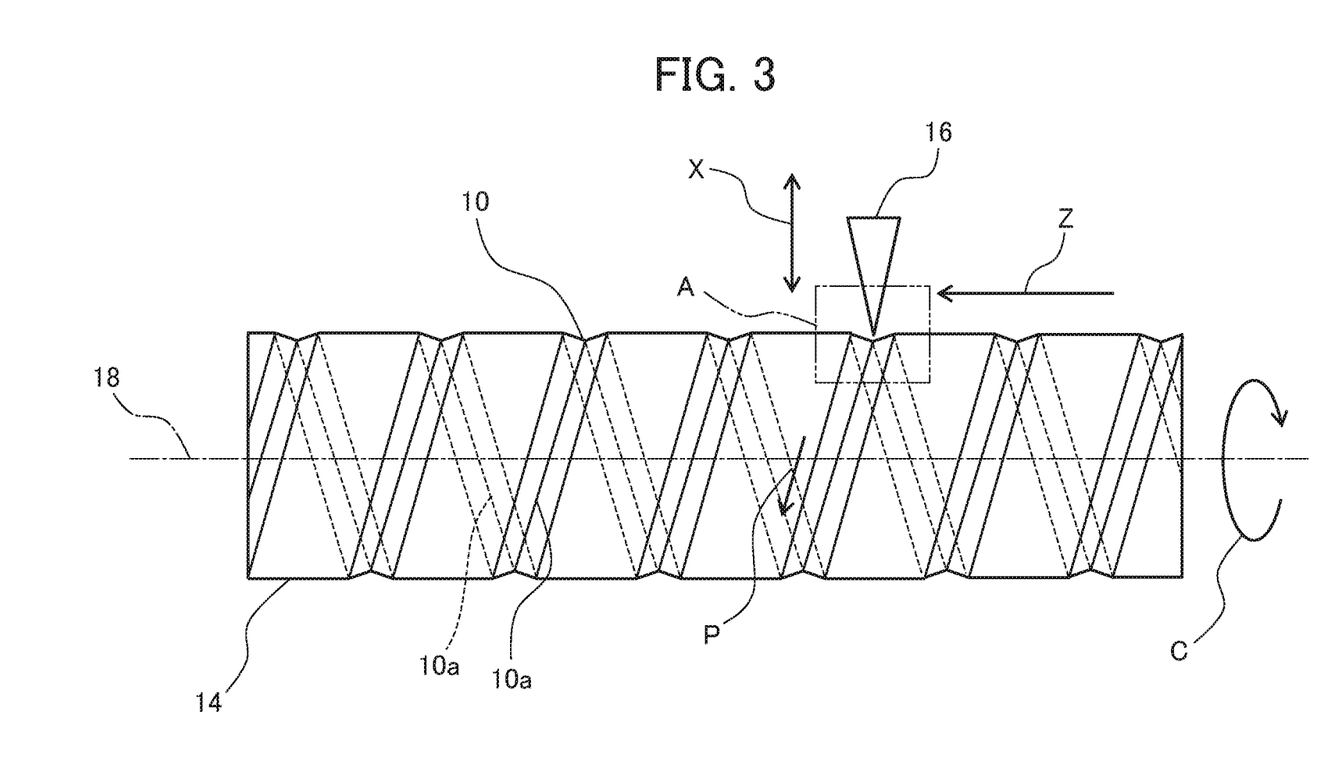
FIG. 3 shows a workpiece during thread cutting.

Before explaining the configuration of the control device 100, a description will be given of thread cutting with reference to FIGS. 2 and 3. Here, FIG. 2 is a diagram showing a screw 12 created by the thread cutting. FIG. 3 shows a workpiece 14 during the thread cutting.

As shown in FIG. 2, the screw 12 created by thread cutting has a thread groove 10 having sufficient depth formed in a spiral shape on its outer peripheral surface. The control device 100 for the machine tool according to an aspect of the present disclosure relatively rotates the cutting tool and the workpiece and moves the cutting tool relative to the workpiece to perform cutting, thereby forming the thread groove 10.

As indicated by arrow P in FIG. 3, a cutting tool 16 performs cutting to form the thread groove 10 on the workpiece 14 a plurality of times along a predetermined path 10a (i.e., the location of the thread groove 10) on the workpiece 14. The path 10a is present in a spiral manner over the entire circumference of the outer peripheral surface of the workpiece 14. FIG. 3 shows a state immediately after the start of the cutting, where the thread groove 10 is still shallow. By repeating the cutting a plurality of times, a deep thread groove 10 as shown in FIG. 2 is formed to complete the final screw 12.

In FIG. 3, the workpiece 14 is attached to the spindle 18, and is controlled to rotate in the rotational direction indicated by arrow C. The rotation coordinate axis indicated by arrow C is called the C-axis. In other words, the C-axis corresponds to angular coordinates indicating an angle about the spindle 18.

The cutting tool 16 moves along the path 10a on the surface of the workpiece 14 which is rotating to perform cutting of the thread groove 10. Therefore, the cutting tool 16 is in synchronization with the rotation in the C-axis direction of the workpiece 14, and is controlled to move along the Z-axis which is a coordinate axis of the workpiece 14 in the longitudinal direction.

Furthermore, the cutting tool 16 gradually moves vertically with respect to the surface of the workpiece 14, i.e. in the X-axis direction which is the coordinate axis in the radial direction each time cutting is performed. Therefore, the cutting tool 16 is controlled to perform cutting at a gradually deeper position with respect to the workpiece 14.

Next, a configuration of the control device 100 for the machine tool according to one aspect of the present disclosure will be described. As shown in FIG. 1, the control device 100 includes an oscillating operation execution determination unit 102, an oscillation condition calculation unit 104, an oscillation command generation unit 106, an adder 108, and a control unit 110.

As the control device 100, for example, a numerical controller is used. The control device 100 is realized, for example, by causing a computer having a CPU, memory, or the like to load a program according to the present embodiment.

The oscillating operation execution determination unit 102 determines whether to execute the oscillating operation for oscillating the cutting tool 16 in the radial direction (X-axis direction) of the workpiece 14. This determination is performed based on a machining program inputted from the outside. The oscillating operation execution determination unit 102 according to one aspect of the present disclosure is characterized in that it determines to intermittently execute the oscillating operation. That is, the oscillating operation execution determination unit 102 determines the execution of the intermittent oscillating operation so that the oscillating operation for performing relative reciprocating vibration between the cutting tool 16 and the workpiece 14 and the non-oscillating operation for not performing the reciprocating oscillation are alternately repeated. Thus, the oscillating operation and the non-oscillating operation are repeatedly executed alternately in the same machining pass.

It is preferable for the oscillating operation execution determination unit 102 to determine the execution of the oscillating operation so as to perform oscillating cutting, in the present cutting-in operation, at a position different from the portion at which the oscillating cutting was performed in the previous cutting-in operation. Thus, since it is possible to include more reliably the portion at which the cutting was performed previously, in the present cutting, so-called idling is generated more reliably, whereby chips are shredded more reliably.

Furthermore, it is preferable for the oscillating operation execution determination unit 102 to determine to intermittently execute the cutting-in by the oscillating operation, and thereafter to execute the cutting-in by the non-oscillating operation in the next pass. Thus, for example, in a case in which the non-oscillating cutting is executed in the final pass after the execution of the oscillating cutting, it is possible to reliably shred chips. This will be described later in detail.

It is also preferable for the oscillating operation execution determination unit 102 to determine to execute the non-oscillating cutting until the positional deviation which is a deviation between the position command and the actual position becomes equal to or less than a predetermined threshold in a non-oscillating cutting portion by the intermittent oscillating operation. Thus, in the non-oscillating cutting portion by the intermittent oscillating operation, it is possible to reliably shred chips. This will be described later in detail.

Figure 4:
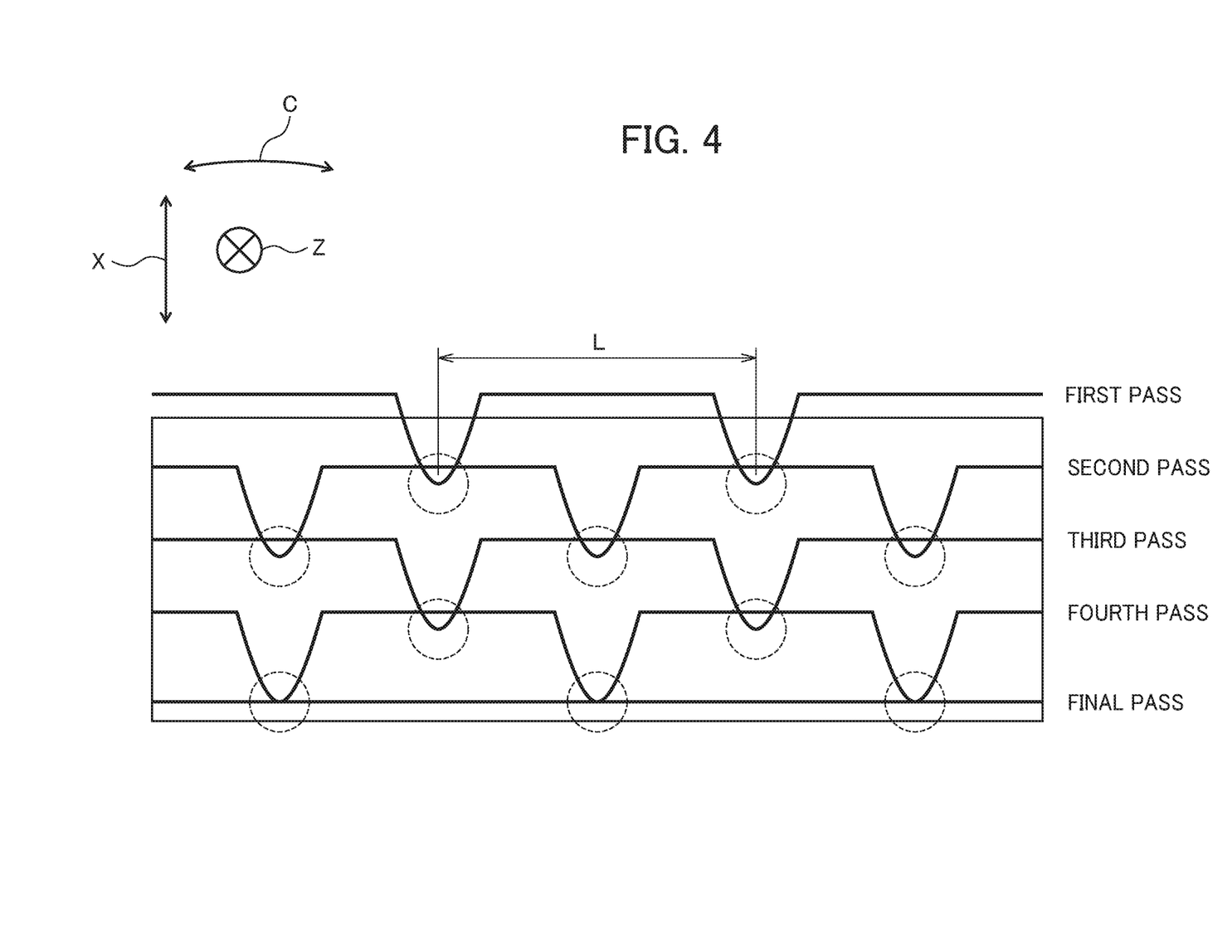
FIG. 4 is a diagram for explaining the operation of thread cutting by the control device for the machine tool according to an aspect of the present disclosure.

The oscillation condition calculation unit 104 calculates the condition of the oscillating operation to be outputted to the oscillation command generation unit 106 based on at least one of the machining program, the machining parameter, and the feedback value from the machine tool. For example, as shown in FIG. 1, the oscillation condition calculation unit 104 calculates the conditions such as the interval of the oscillating operation (the distance between adjacent vertices in the oscillation waveform as shown in FIG. 4 to be described later), the amplitude, and the cycle based on the machining program inputted from the outside.

It is preferable for the oscillation condition calculation unit 104 to change the interval of the oscillating operation. More specifically, the oscillation condition calculation unit 104 may change the interval of the oscillating operation between different machining passes. Furthermore, the oscillation condition calculation unit 104 may change the interval of the oscillating operation within the same machining pass. Alternatively, the oscillation condition calculation unit 104 may change the interval of the oscillating operation between different machining passes, and may change the interval of the oscillating operation within the same machining pass.

Furthermore, the oscillation condition calculation unit 104 may change the interval of the oscillating operation in accordance with the diameter of the workpiece 14. For example, the interval of the oscillating operation is set to be longer as the diameter of the workpiece 14 becomes smaller, i.e., as the number of times of cutting increases. Alternatively, on the contrary, the interval of the oscillating operation may be set to be shorter as the diameter of the workpiece 14 becomes smaller, i.e. the number of times of cutting increases. The setting of the interval of the oscillating operation will be described in detail later.

The oscillation command generation unit 106 generates an oscillation command of the oscillating operation based on the determination result by the oscillating operation execution determination unit 102. Furthermore, the oscillation command generation unit 106 generates an oscillation command of the oscillating operation according to the oscillation condition calculated by the oscillation condition calculation unit 104. The oscillation command generation unit 106 according to an aspect of the present disclosure generates an oscillation command so that the non-oscillating cutting portion of the present cutting-in operation includes a portion at which the oscillating cutting was performed in the previous cutting-in operation. Alternatively, the oscillation command generation unit 106 generates the oscillation command so that the oscillating cutting portion of the present cutting-in operation includes a portion at which the non-oscillating cutting was performed in the previous cutting-in operation. This makes it possible to generate so-called idling more reliably, and to shred chips more reliably.

The adder 108 calculates positional deviation which is the difference between a position feedback based on the position detection by an encoder (not shown) provided to the motor 120 and a position command of the feed axis. The position command of the feed axis and the positional deviation are inputted to the control unit 110 to be described later.

The control unit 110 superimposes the oscillation command generated by the oscillation command generation unit 106 on the position command of the feed axis and the positional deviation, thereby generating a drive command for the motor 120 that drives the feed axis. It should be noted that, in one aspect of the present disclosure, the position command of the feed axis is generated once, and the oscillation command is superimposed on the generated position command; however, the present disclosure is not limited thereto. The oscillation command may be superimposed in advance, and the position command of the feed axis may be generated.

Figure 5:
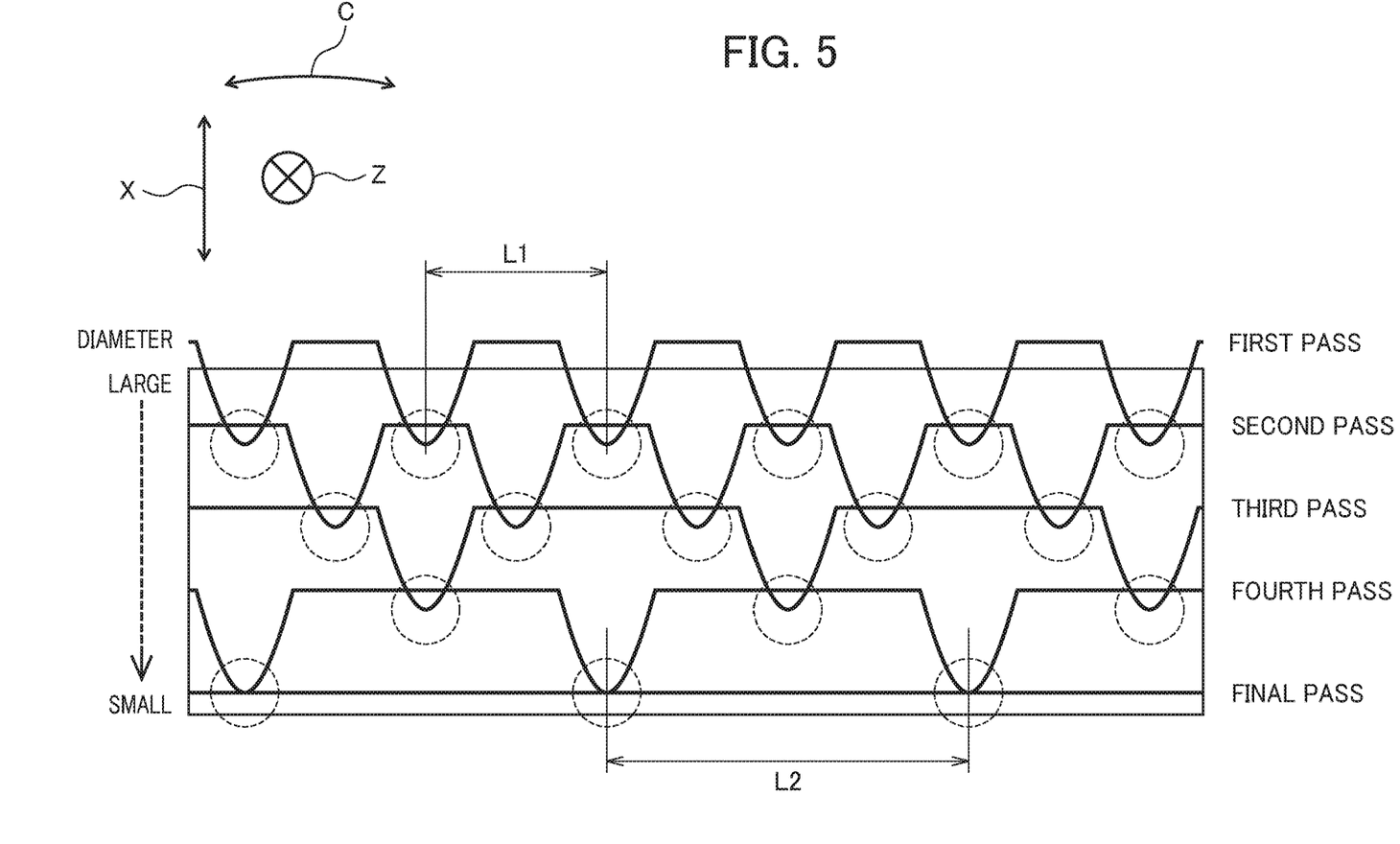
FIG. 5 is a diagram for explaining the operation of thread cutting by the control device for the machine tool according to an aspect of the present disclosure.
Figure 6:
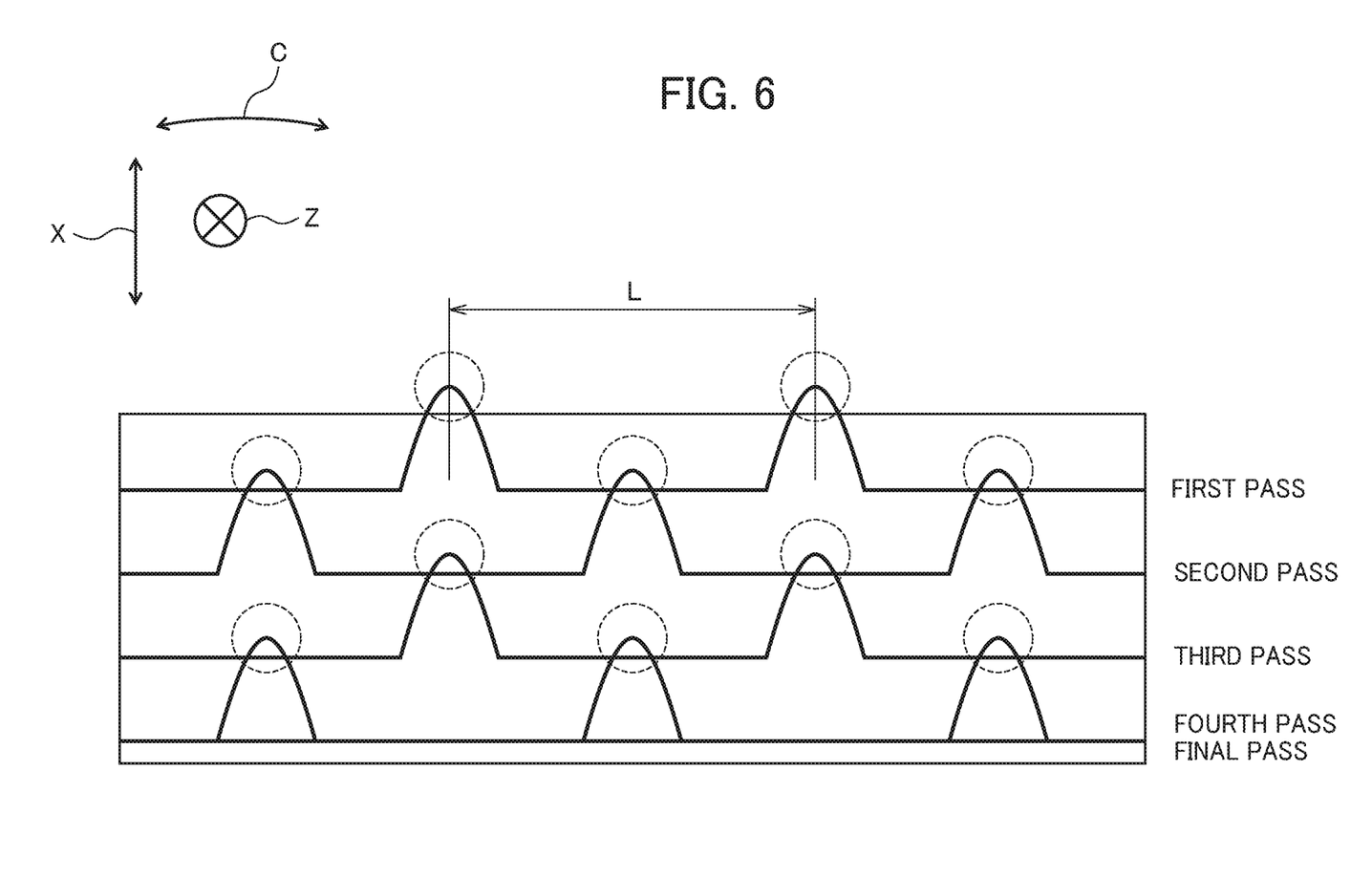
FIG. 6 is a diagram for explaining the operation of thread cutting by the control device for the machine tool according to an aspect of the present disclosure.

Next, the operation of the thread cutting by the control device 100 for the machine tool according to one aspect of the present disclosure will be described in detail with reference to FIGS. 4 to 6. Herein, FIGS. 4 to 6 are diagrams for explaining the operation of the thread cutting by the control device 100 for the machine tool according to one aspect of the present disclosure. These figures correspond to the part A of FIG. 3 which is viewed in the Z-axis direction from the side on which the cutting starts. More specifically, FIG. 4 is a diagram showing an example of a case in which the interval of the oscillating operation in each machining pass (hereinafter, simply referred to as pass) is constant. FIG. 5 is a diagram showing an example in a case of increasing the interval of the oscillating operation as the diameter of the workpiece 14 decreases. FIG. 6 is a diagram showing an example in a case in which the oscillating operation in each pass is not in a direction of cutting-in to the workpiece 14, but rather in a direction of being separated away from the workpiece 14.

It should be noted that the C-axis, the Z-axis and the X-axis in FIGS. 4 to 6 are used in the same definition as the C-axis, the Z-axis and the X-axis in FIG. 3 described above. Furthermore, in FIGS. 4 to 6, the portion surrounded by a broken line is a portion including, in the present cutting, the portion at which the cutting has been performed previously, and thus indicates the portion at which so called idling occurs and chips are shredded.

In the operation example shown in FIG. 4, any of the passes of the first pass to the fourth pass is intended to perform an intermittent oscillating operation, and a linear non-oscillating cutting and an oscillating cutting which is deeply cut-in in a curved shape are performed alternately and repeatedly. Furthermore, in any of the first to fourth passes, the interval L of the oscillating operation shown in FIG. 4 is constant. As for the final pass, since it is finishing processing, it is only non-oscillating cutting without oscillating, and thus is entirely linear cutting.

Here, the distance L of the oscillating operation, i.e., the distance between adjacent vertices in the oscillation waveform as shown in FIG. 4, can be set corresponding to the length of chips allowed. The length of chips allowed is set to a length that does not inhibit the cutting by the chips being entangled in the cutting tool 16 during the cutting, for example. Thus, it is possible to shred the chips without inhibiting the cutting. The length of the chips allowed can be specified by G code, a parameter, or the like, so that the interval L of the intermittent oscillating operation can be specified.

In the operation example shown in FIG. 5, similarly to the operation example shown in FIG. 4, any of the passes of the first pass to the fourth pass is intended to perform an intermittent oscillating operation, and a linear non-oscillating cutting and oscillating cutting which is deeply cut-in in a curved shape are performed alternately and repeatedly. However, as shown in FIG. 5, the interval of the oscillating operation for each pass of the first pass to the fourth pass differs. As for the final pass, since it is finishing processing, it is only non-oscillating cutting without oscillating, and thus is entirely linear cutting.

More specifically, the interval of the oscillating operation is set to be longer as the diameter of the workpiece 14 becomes smaller, i.e. as the number of times of cutting increases. Therefore, as shown in FIG. 5, the interval L2 of the oscillating operation of the fourth pass is set to be longer than the interval L1 of the oscillating operation of the first pass. Thus, it is possible to keep the length of chips constant by setting the interval of oscillating operation longer, thereby avoiding a situation in which the circumferential length of the workpiece 14 becomes shorter as the number of times of cutting increases.

In the operation example shown in FIG. 6, similarly to the operation example shown in FIG. 4, any of the passes of the first pass to the fourth pass is intended to perform an intermittent oscillating operation, and a linear non-oscillating cutting and oscillating cutting in a curved shape are performed alternately and repeatedly. Furthermore, in any of the passes of the first to fourth passes, the interval L of the oscillating operation is constant as in the operation example shown in FIG. 4. However, in each of the first to fourth passes, the oscillating operation is not in the direction of cutting-in to the workpiece 14, but rather in the direction of being separated away from the workpiece 14. In other words, as compared with the operation examples of FIGS. 4 and 5, the oscillating direction is opposite.

Here, when performing the oscillating operation in the direction of cutting-in to the workpiece 14 as shown in FIGS. 4 and 5, in order to determine the oscillation amplitude so as to include, in cutting in the next pass, a portion at which the cutting has been already performed in the present pass, the depth of cutting-in in the next pass depends on the oscillation amplitude of the present pass. Therefore, it is necessary to look ahead at the machining program by the control device 100 such as a numerical controller. In contrast, by reversing the oscillating direction as in the operation example shown in FIG. 6, the oscillation amplitude of the next pass no longer depends on the oscillation amplitude of the present pass. Therefore, it is not necessary to look ahead at the machining program by the control device 100 such as a numerical controller.

Next, finishing processing in the final pass of the thread cutting by the control device 100 for the machine tool according to one aspect of the present disclosure will be described in detail with reference to FIGS. 7 and 8. Here, FIG. 7 is a diagram showing the finishing processing in the final pass of a conventional thread cutting process. FIG. 8 is a diagram showing finishing processing in the final pass of the thread cutting by the control device 100 for the machine tool according to an aspect of the present disclosure. The C-axis, Z-axis, and X-axis in FIGS. 7 and 8 are used with the same definition as the C-axis, Z-axis, and X-axis in FIG. 3 described above. Furthermore, the portion surrounded by a broken line in FIG. 8 is a portion including, in the present cutting, the portion at which the cutting was performed previously, and thus indicates the portion at which so-called idling occurs and chips are shredded.

Figure 7:
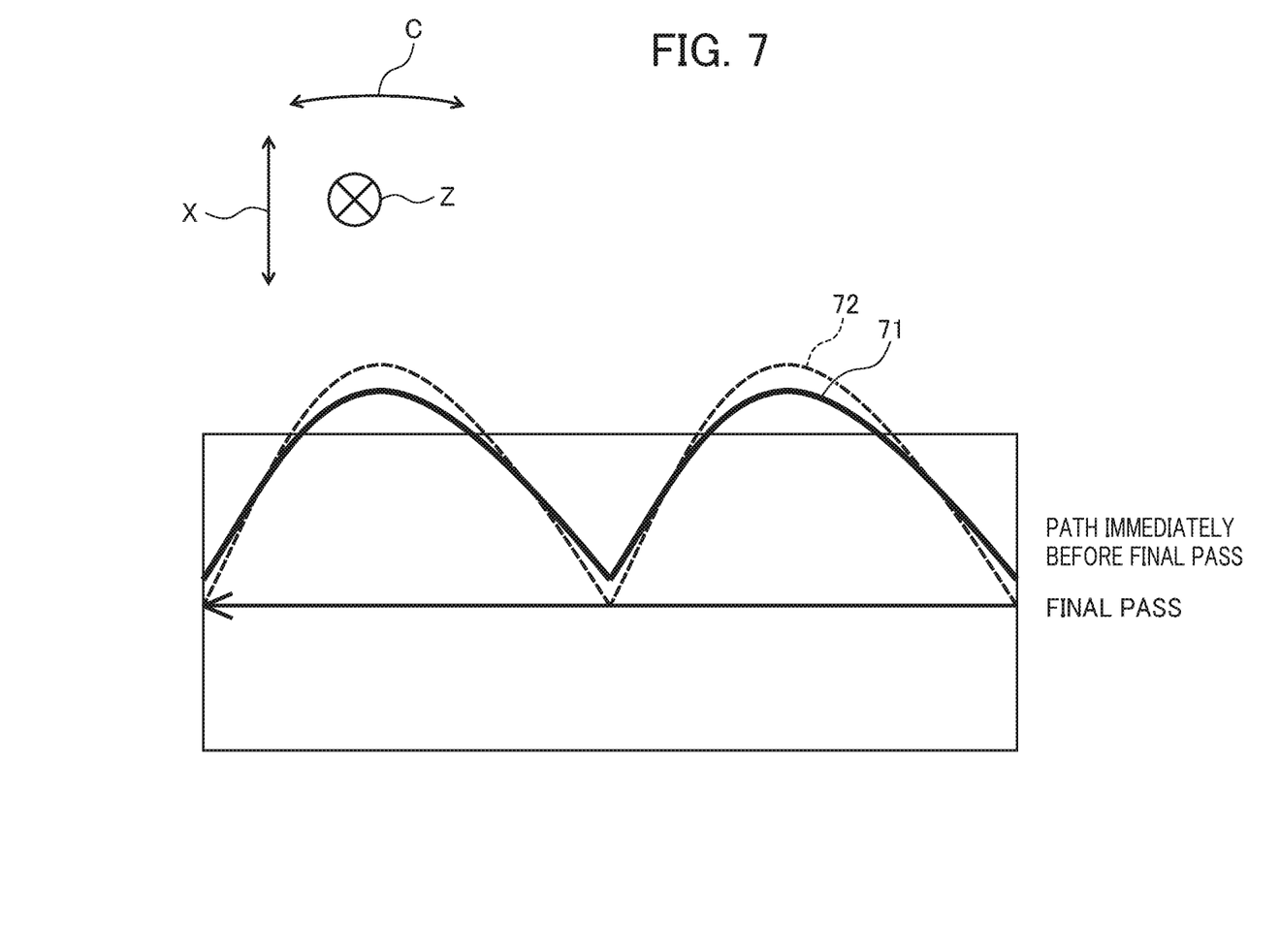
FIG. 7 is a diagram showing finishing processing in the final pass of the conventional thread cutting.
Figure 8:
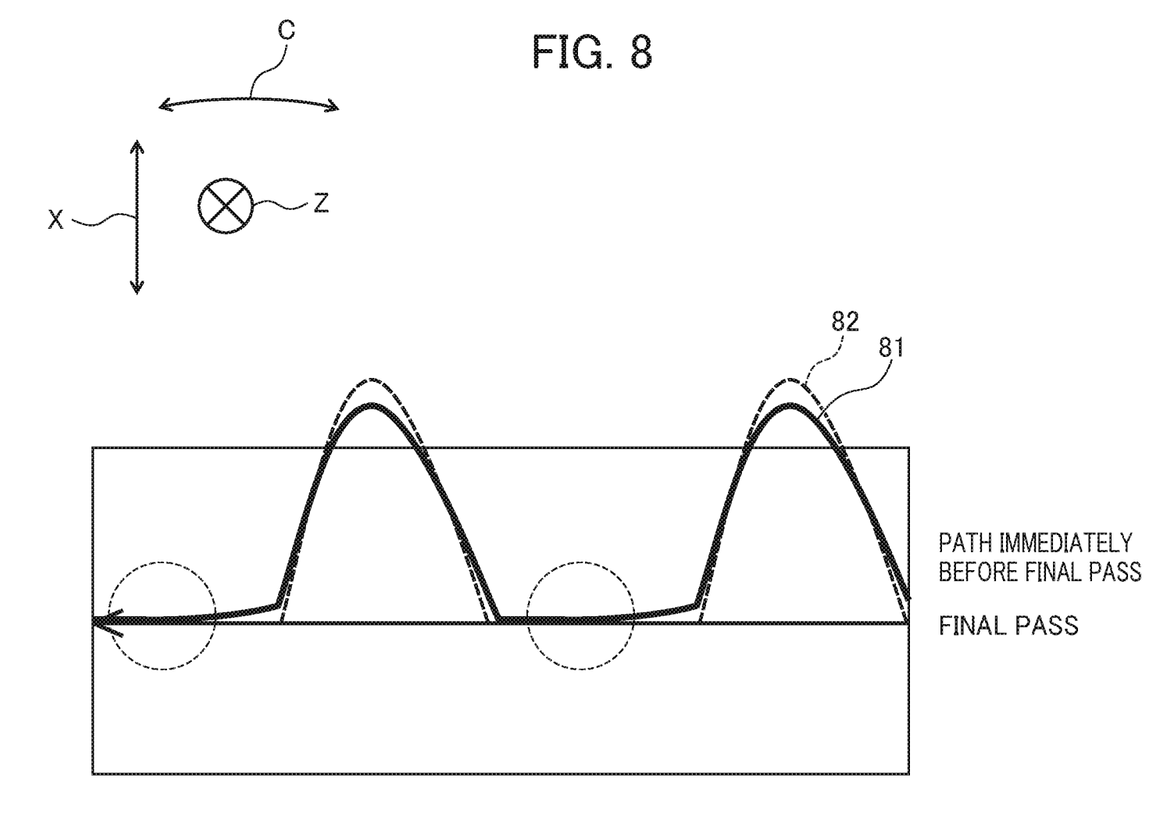
FIG. 8 is a diagram showing finishing processing in the final pass of the thread cutting by the control device for the machine tool according to an aspect of the present disclosure.

In the conventional thread cutting, in a case in which the cutting-in operation without oscillating in the final pass is performed after the cutting-in operation with oscillating in a pass immediately before the final pass, it is assumed that, as shown by the broken line 72 in FIG. 7, a location at which a machined portion in the final pass includes a portion at which machining in the pass immediately before the final pass has been performed exists (i.e., the location where the broken line 72 overlaps the straight line of the final pass, which is a valley portion of the broken line 72, and is a so-called idling portion), a result of which chips are shredded. However, in practice, as indicated by the solid line 71 in FIG. 7, a location at which a machined portion in the final pass does not include a portion at which machining in the pass immediately before the final pass was performed does not exist (i.e., the location where the solid line 71 overlaps the straight line of the final pass), a result of which chips may not be shredded. This is due to the positional deviation which is deviation between the position command and the actual position in the oscillating operation.

In contrast, in one aspect of the present disclosure, ideally, as indicated by the broken line 82 in FIG. 8, a location at which the machined portion in the final pass includes a portion at which machining was performed in the pass immediately before the final pass is generated, and in practice, as indicated by the solid line 81 and the broken line surrounded by a circle in FIG. 8, a location at which the machined portion in the final pass includes a portion at which machining was performed in the pass immediately before the final pass is generated, whereby chips are shredded. This is because the positional deviation converges in the non-oscillating operation by providing the oscillating operation and the non-oscillating operation in the same pass. This enables reliable shredding of the chips in the final pass.

The period of the non-oscillating operation can be determined simply by a predetermined value in terms of time or distance, or can be determined based on whether or not the positional deviation is equal to or less than a predetermined threshold value. Furthermore, the above explanation has been described taking the finishing processing in the final pass of the thread cutting as an example; however, the present invention is not limited thereto, and can be applied to all cases in which the cutting-in operation without oscillating is performed in the next pass after the cutting-in operation with oscillating.

In summary, according to an aspect of the present disclosure, the following effects can be achieved.

(1) A control device 100 for a machine tool that performs a coordinated operation of at least one spindle 18 for relatively rotating a cutting tool 16 and a workpiece 14, and at least one feed axis for moving the cutting tool 16 relative to the workpiece 14, and performs thread cutting while causing the cutting tool 16 to perform a plurality of times a cutting-in process on the workpiece 14 in a radial direction (X direction), the control device 100 including: an oscillating operation execution determination unit 102 that determines whether to execute an oscillating operation that causes the cutting tool 16 to oscillate in the radial direction (X direction) of the workpiece 14; an oscillation command generation unit 106 that generates an oscillation command of the oscillating operation based on a determination result by the oscillating operation execution determination unit 102; and a control unit 110 that superimposes the oscillation command on a position command of the feed axis to generate a drive command of the feed axis. Furthermore, the oscillating operation execution determination unit 102 determines to intermittently execute the oscillating operation, and the oscillation command generation unit 106 generates an oscillation command so that a non-oscillating cutting portion of a present cutting-in operation includes a portion at which oscillating cutting was performed in a previous cutting-in operation, or so that an oscillating cutting portion of the present cutting-in operation includes a portion at which non-oscillating cutting was performed in the previous cutting-in operation. Thus, it is possible to reliably shred chips without extending the cycle time as compared with the conventional technology, by performing an intermittent oscillating operation. In addition, since the number of times of oscillating operation can be reduced, it is possible to reduce the load on the machine tool due to the oscillating operation. Furthermore, in the conventional technology, there may be a case in which incomplete cutting occurs due to a large positional deviation caused by the response delay or the like during the oscillating operation, a result of which chips cannot be shredded. However, according to the present disclosure, since the positional deviation is converged at the time of the non-oscillating operation, it is possible to reliably shred the chips when executing the non-oscillating operation in the present pass after the oscillating operation in the previous pass.

(2) The oscillating operation execution determination unit 102 is configured to determine execution of an oscillating operation so as to perform oscillating cutting, in a present cutting-in operation, at a position different from a portion at which oscillating cutting was performed in a previous cutting-in operation. Thus, since it is possible to include more reliably, in the present cutting, a portion at which the cutting was performed previously, it is possible to generate so-called idling more reliably, and shred chips more reliably.

(3) The control device 100 further includes an oscillation condition calculation unit 104 that calculates a condition of an oscillating operation to be outputted to the oscillation command generation unit 106 based on at least one of a machining program, a machining parameter, and a feedback value from the machine tool, and the oscillation condition calculation unit 104 is configured to change an interval of the oscillating operation. Thus, it is possible to calculate the conditions such as the interval, amplitude, and cycle of the oscillating operation, and thus it is possible to shred chips more reliably. In particular, it is possible to adjust the length of the chips by changing the interval of the oscillating operation.

(4) The oscillation condition calculation unit 104 is configured to change the interval of the oscillating operation between different machining passes. As a result, it is possible to shred chips more reliably and adjust the length of the chips.

(5) The oscillation condition calculation unit 104 is configured to change the interval of the oscillating operation within a same machining pass. As a result, it is possible to shred chips more reliably and adjust the length of the chips.

(6) The oscillation condition calculation unit 104 is configured to change the interval of the oscillating operation in accordance with a diameter of the workpiece 14. Thus, it is possible to keep the length of chips constant by setting the interval of oscillating operation longer, thereby avoiding a situation in which the circumferential length of the workpiece 14 becomes shorter as the number of times of cutting increases, whereby it is possible to perform more efficient and smooth thread cutting.

(7) The oscillating operation execution determination unit 102 is configured to determine to intermittently execute cutting-in by an oscillating operation, and thereafter to execute cutting-in by a non-oscillating operation in a next pass. Thus, it is possible to shred chips reliably when performing the non-oscillating cutting in the next pass after performing the oscillating cutting. For example, it is possible to shred chips reliably even in the finishing processing of the final pass.

(8) The oscillating operation execution determination unit 102 is configured to determine to execute non-oscillating cutting until a positional deviation becomes equal to or less than a predetermined threshold in a non-oscillating cutting portion by an intermittent oscillating operation. Thus, it is possible to shred chips more reliably in the non-oscillating cutting portion by an intermittent oscillating operation.

It should be noted that the present invention is not limited to the above embodiments, and variations and improvements within a scope that can achieve the object of the present invention are included in the present invention.

EXPLANATION OF REFERENCE NUMERALS

10 thread groove
12 screw
14 workpiece
16 cutting tool
18 spindle
100 control device
102 oscillating operation execution determination unit
104 oscillation condition calculation unit
106 oscillation command generation unit
108 adder
110 control unit
120 motor
X X-axis
Z Z-axis
C C-axis
L, L1, L2 interval of oscillating operation

What is claimed is:

1. A control device for a machine tool that performs a coordinated operation of at least one spindle for relatively rotating a cutting tool and a workpiece, and at least one feed axis for moving the cutting tool relative to the workpiece, and performs thread cutting while causing the cutting tool to perform a plurality of times a cutting-in process on the workpiece in a radial direction, the control device comprising:
    an oscillating operation execution determination unit that determines whether to execute an oscillating operation that causes the cutting tool to oscillate in the radial direction of the workpiece;
    an oscillation command generation unit that generates an oscillation command of the oscillating operation based on a determination result by the oscillating operation execution determination unit; and
    a control unit that superimposes the oscillation command on a position command of the feed axis to generate a drive command of the feed axis,
    wherein the oscillating operation execution determination unit determines to intermittently execute the oscillating operation, and
    wherein the oscillation command generation unit generates an oscillation command so that a non-oscillating cutting portion of a present cutting-in operation includes a portion at which oscillating cutting was performed in a previous cutting-in operation, or so that an oscillating cutting portion of the present cutting-in operation includes a portion at which non-oscillating cutting was performed in the previous cutting-in operation.

2. The control device for the machine tool according to claim 1, wherein the oscillating operation execution determination unit determines execution of an oscillating operation so as to perform oscillating cutting, in a present cutting-in operation, at a position different from a portion at which oscillating cutting was performed in a previous cutting-in operation.

3. The control device for the machine tool according to claim 1, further comprising an oscillation condition calculation unit that calculates a condition of an oscillating operation to be outputted to the oscillation command generation unit based on at least one of a machining program, a machining parameter, and a feedback value from the machine tool,
    wherein the oscillation condition calculation unit changes an interval of the oscillating operation.

4. The control device for the machine tool according to claim 3, wherein the oscillation condition calculation unit changes the interval of the oscillating operation between different machining passes.

5. The control device for the machine tool according to claim 3, wherein the oscillation condition calculation unit changes the interval of the oscillating operation within a same machining pass.

6. The control device for the machine tool according to claim 3, wherein the oscillation condition calculation unit changes the interval of the oscillating operation in accordance with a diameter of the workpiece.

7. The control device for the machine tool according to claim 1, wherein the oscillating operation execution determination unit determines to execute non-oscillating cutting until a positional deviation becomes equal to or less than a predetermined threshold in a non-oscillating cutting portion by an intermittent oscillating operation.

* * * * *